(12) United States Patent
Kressin

(10) Patent No.: US 6,407,735 B2
(45) Date of Patent: *Jun. 18, 2002

(54) METHOD FOR GENERATING SURFACE REPRESENTATIONS OF OBJECTS FROM LAYERED DATA

(75) Inventor: Kenneth R. Kressin, Apple Valley, MN (US)

(73) Assignee: Crump Group Inc., Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,172

(22) Filed: Nov. 13, 1997

(51) Int. Cl.[7] ............................................... G06T 15/00
(52) U.S. Cl. ...................... 345/420; 345/421; 345/581
(58) Field of Search ............................... 345/421, 429, 345/420, 433

(56) References Cited

U.S. PATENT DOCUMENTS

| 5,139,338 A | | 8/1992 | Pomerantz et al. |
| 5,621,648 A | | 4/1997 | Crump |
| 5,880,961 A | * | 3/1999 | Crump .................. 364/468.19 |
| 5,988,862 A | * | 11/1999 | Kacyra et al. .............. 564/578 |

* cited by examiner

Primary Examiner—Michael Razavi
Assistant Examiner—Motilewa Good-Johnson
(74) Attorney, Agent, or Firm—Moore & Hansen

(57) ABSTRACT

A method for generation of a surface representation of an object from layered pixel data converts the pixel data into a series of layers of ordered point clouds. The layered ordered point clouds are stitched together for form a surface representation. Cleanup and sampling of the pixel data or the ordered point could data may be performed. The method also contemplates generation of a surface representation from point data.

3 Claims, 6 Drawing Sheets

METHOD FOR GENERATING SURFACE REPRESENTATIONS OF OBJECTS FROM LAYERED DATA

BACKGROUND OF THE INVENTION

The present invention relates to a method for analyzing and ordering informational data representing the physical characteristics of an object. More specifically, the invention relates to the generation of ordered point cloud information from layered input data and the output of a surface-based object representation.

Various apparatus and methods exist in the art for reverse engineering an existing product in order to determine its structure and makeup. Such a reverse engineering process may be desirable because a computer aided design file representing the object does not exist, because a mold for the object does not exist, or simply because the part has been modified independently of the existing rebuilt materials.

It is often desirable to know the geometry, both external and internal, of existing objects. Various apparatus for the delamination of such objects are known in the art. For example, such an apparatus and method for creating three-dimensional modeling data from an object is disclosed in U.S. Pat. No. 5,621,648, to Crump, which is hereby incorporated by reference in its entirety. The '648 patent discusses and discloses the delamination of an object encased in an encasing material by successively cutting off layers of the encased object, imaging the exposed surfaces and producing a surface model by lofting surfaces on a stack of generated spline art layers. Such a method and apparatus allows the object to be examined for both external and internal geometry.

Other methods and apparatus for traditional measuring of dimensions and generation of surfaces involve extensive use of a probe and metering technique by which a physical probe is placed at numerous and various points on an object, making measurements of the relative location at each touching point. Such a process is tedious and is subject to the human error of misplacing the probe or failing to recognize important changes in geometry of a system. Even if such a probe and meter system were automated, the time consumed by such a system would be immense due to the large numbers of points to be probed. Further, such a probe and metering technique does not capture internal geometry well, especially internal geometry with no external availability. Such geometry will not be captured by a probe and meter technique.

Delaminating systems and other systems which generate or provide physical characteristic data of various objects, such as magnetic resonance imaging (MRI), X-ray technology and the like, use a wide variety of output file formats and output protocols to transmit raw data information pertaining to the object to a computer aided design tool or other computer system for construction of a three-dimensional image representative of the object. Many such systems export a continuous stream of data, and many surfacing computer programs, commonly used to work with such data sets require input of all data at one time. The vast amount of data generated by such a process requires a great deal of storage space and computer power in order to be able to work with it. Too much data leads to an unwieldy process. Working with a full data set of information creates numerous problems with the usefulness of such data.

The delaminating machine disclosed in the '648 patent and other object representation technologies can provide data generated layer by layer. When working with layered data, smaller amounts of information are used at one specific time, reducing the time and storage requirements for image and object reconstruction. It would be desirable to be able to use layer by layer data from a delamination or other imaging system to construct a computer aided design image or specific output file format which is more usable because it has a reduced size without sacrificing informational content.

A further problem with other systems or methods for generating three-dimensional output data lies in their inability to appropriately and accurately distinguish between internal and external geometry configurations. Capturing a complete data set incorporating all the geometry of an object has several requirements, including the gathering of enough data points to define a surface, and measurement and sensing capable of providing data representative of all surfaces. If the surface to be analyzed or reconstructed is obstructed, such as an internal surface or the inside of a specific part, important geometry will be difficult or impossible to measure or photograph, and will be especially difficult to distinguish using probe and meter techniques. Further, a method is required to distinguish between external and internal geometries to be able to accurately generate surface representations. A system such as that disclosed in the '648 patent provides data representative of all internal and external geometry. However, once complete internal and external geometry representations have been captured, or generated, the amount of data required to accurately represent such surfaces can be extreme given the resolution of the generated representations. It would be desirable to provide a method which could accurately and appropriately distinguish between internal and external geometry points.

When layer by layer data is sent in such a layered order to a software program or integrated hardware and software system for generation of an output file, it may take many formats. For example, in the '648 patent, each scanned surface layer will typically contain a series of pixels of either black or white, with one color representing encasing material, and the other pixel color representing the object. Other imaging technologies may also provide layered data representative of object and non-object pixels. It would be desirable to provide a method of taking data representations of this type and for processing them to produce a three-dimensional surface representation while reducing the amount of information without reducing the quality of the final generated image.

Layer by layer data will contain certain object geometries which may be difficult to recognize. Such geometries include the first or last layer, referred to as a cap, on which a geometry appears. This may be an external geometry or an internal geometry. Also, at certain levels or layers throughout an object, especially a complex object, geometries may split. For example, on one layer there may be one section of a whole, and on the next, there may be two sections of the same whole that have split from the first section of the whole. A table fork for example splits from the handle to a series of tines. It has been difficult for prior art methods to distinguish a split, or conversely, a join, in layer by layer geometry. It would, therefore, be desirable to provide a method by which caps, splits, and joins are recognized and accurately dealt with. It would also be desirable to provide a method which would convert layer by layer pixel data to point data which may be more suitably used by a data processor such as a computer and associated software.

SUMMARY OF THE INVENTION

It is an object of the present invention to provide a method for generating ordered point cloud information based on layer by layer data.

It is another object of the present invention to improve a method for recognition and treatment of caps, splits, and joins in three dimensional object representation data.

It is still another object of the present invention to provide a method for selective sampling of points and layers in a layer by layer representation of a three-dimensional object.

It is yet another object of the present invention to provide a method for generation of three-dimensional surface representations of an object by stitching layered point clouds together to form a series of facets.

The present invention achieves the preceding objects and overcomes the problems of the prior art by providing a method of analyzing, refining and working with layer by layer pixel data information generated by a delaminating machine or the like to provide an output format representative of a three dimensional surface.

The preferred method of the present invention comprises the generation of layer by layer ordered point clouds which define both the internal and external geometry of the object being analyzed, and the stitching together of the layered point clouds to form a surface representation of the object. The data is typically presented from a delaminating machine or the like, in which a two dimensional pixel grid will be defined in which a pixel of one color defines areas of the grid which represent object material, and pixel of a different color defines the areas of the grid which represent non-object material. Typically, these pixels are black and white. Each layer of pixel information is converted from this pixel representation to a point cloud representation.

The point cloud representation is generated by assigning points representing the surfaces of the object, both external and internal, to object/non-object interfaces, and by ordering the points on the basis of the color of the pixel immediately underneath the point. By the term "underneath the point", it is meant that if the grid were assigned horizontal X coordinates and vertical Y coordinates beginning at the upper left, the pixel underneath a point will be that pixel having the same X value, with a Y value one unit higher. It should be understood that the designation "underneath" may appropriately be changed to accommodate various scanning methods, although the designation described is used for the scanning method described below herein.

When the first point of a new point cloud, which is a series of ordered points, is found in a scanning routine, the point will, because of the nature of the scanning routine, either be an external geometry point or an internal geometry point, depending respectively upon whether the pixel underneath the point is an object pixel or a non-object pixel. Once a first point is found, the method of the present invention will search for the second point, which will be an immediately adjacent point one unit away from the first point. A unit is defined as the gap between a point found and the next point which could be assigned along the surface represented by an interconnection of the surface points. When a point is assigned to a point cloud, it is removed from further consideration for addition to the same or a different cloud. When the method of the present invention finds no subsequent point one unit away from the point being considered, it assumes closure of the current point cloud by verifying that the distance between the final point and the first point of the cloud is one unit. In this manner, all point clouds on a layer are ordered. In turn, all layers of the object layer by layer pixel representation are converted to point cloud data information.

Once point clouds are generated for each layer of the layer by layer pixel data, successive layers of point clouds are stitched together by the method of the present invention to form a surface representation of the complete geometry of the object, both external and internal. The distance between point clouds on successive layers, referred to as neighbor clouds, is measured. A neighbor point cloud to the cloud currently under consideration is defined as the point cloud on an immediately adjacent layer that is closest to the point cloud being considered on the existing layer. Closest is defined as the distance from each point on the current cloud to the closest point of the cloud on the adjacent layer. Most clouds have one neighbor cloud. However, in the case of a bifurcation or joining such as will be described in greater detail below, a cloud may have two or more neighbor clouds.

Once neighbor clouds are defined, the distance between each point of a cloud and the points on its neighbor clouds is determined. The two points on neighbor clouds which are closest to each other, of the points of the two neighbor clouds, are connected together. Following this, each subsequent point later in the order of the cloud is also connected to the point on the neighboring cloud closest to it provided that no points on either cloud are skipped, and that no point is connected to a point behind its current order in the clouds. In other words, the method looks for the closest point to the current point which is on the adjacent cloud, moving forward in the point order of the clouds. Once all points of the neighboring clouds have been stitched together, further connections are added between points on adjacent clouds, and between adjacent points in the cloud, so that each point on each cloud is part of a defined triangle when the points of the clouds are also connected in order.

This series of triangles connecting adjacent layers of the object provides a definition of a surface, with the faces of the triangles forming a surface representation of the object. This surface representation of the object may be generated in a variety of formats. A common format for such a representation is stereolethography tessellation language (STL).

Further methods of the present invention involve isolating the specific layer containing information of the object to be represented, distinguishing between multiple objects to be analyzed in the same encased area provided they do not touch, and specific or method specific sampling techniques to remove or add points within a cloud, entire clouds, or even entire layers to reduce or increase the quantity and/or quality of data required for an accurate representation of the object, while maintaining the integrity and accuracy of the representation.

The method of the present invention also may be used in cropping a set of data. In the isolation or monolith step, the outer boundaries of the object are determined. Once the outer boundaries are known, the method can eliminate layers or portions of layers which do not contain parts of the object. This optional method step may be referred to as cropping.

Some machines or other data generation apparatus may generate data already in point format. The method of the present invention is readily adaptable to utilization with such data, by eliminating the step of conversion of layer by layer pixel data to point data.

The foregoing objects of the present invention will become apparent to those skilled in the art when the following detailed description of the invention is read in conjunction with the accompanying drawings and claims, with like numerals in the drawings referring to similar or identical parts throughout.

DESCRIPTION OF THE PREFERRED EMBODIMENTS

Figure 1:
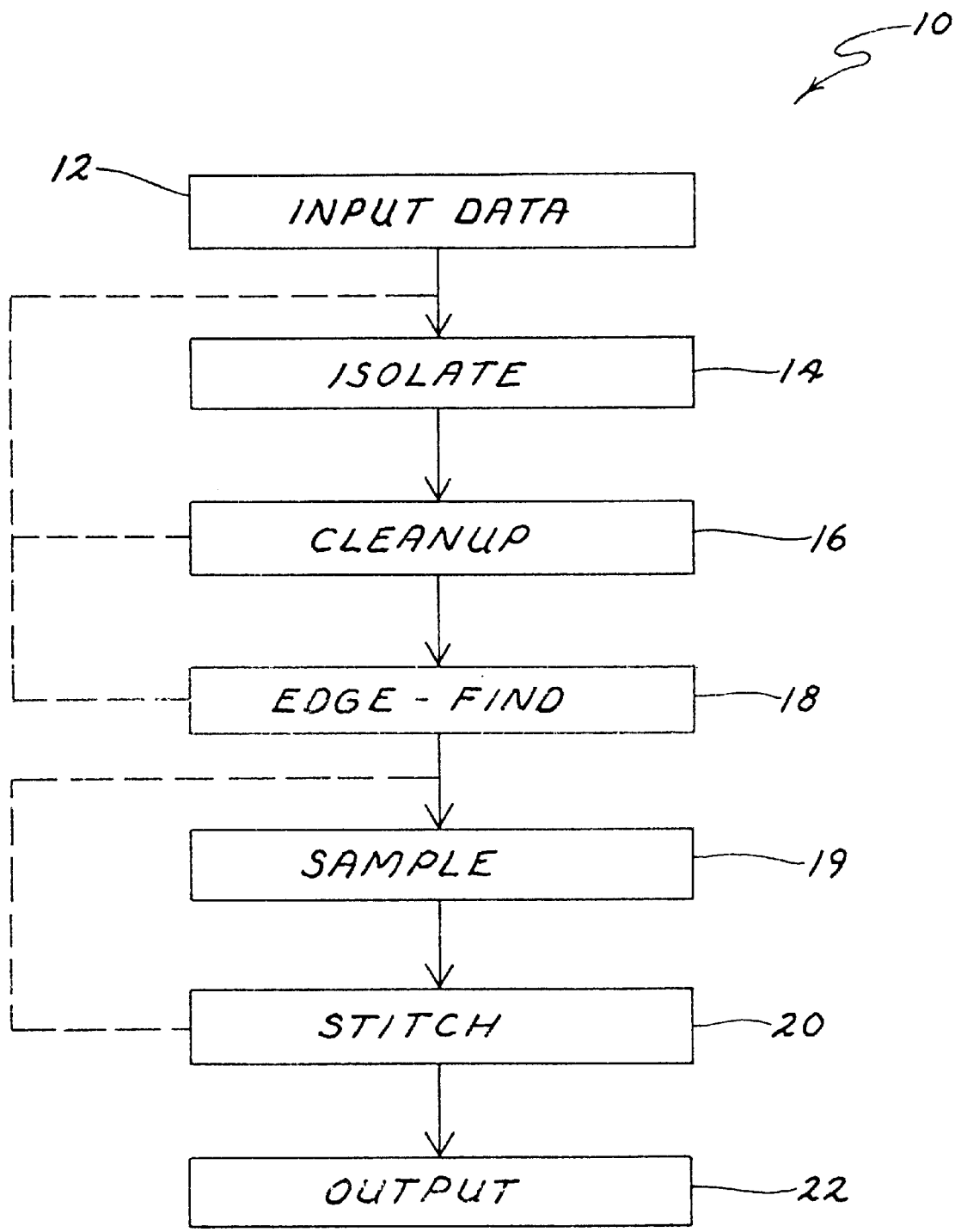
FIG. 1 is a flow diagram of the general method of the present invention.

Referring to the figures and especially to FIG. 1, the present invention 10 is represented in broad form by a flow diagram. Thus, FIG. 1 illustrates a method for the generation of an output representing the surface image of an object. The preferred method utilizes data present in layer by layer form, such as would be generated by a delaminating machine, magnetic resonance imaging machine, X-ray machine, or the like which provides an electronic representation of a slice of an object through the object. This layer by layer representation discloses internal and external geometry of the object being represented. The method of the present invention processes this data and converts the data to a point cloud representation of ordered data points, and then to a surface based representation allowing the complex configuration of internal and external geometries to be reduced to manageable proportions.

The method steps of the present invention 10 lend themselves clearly to a preferred implementation by computer software routines or programs. While the method steps of the present invention may be performed manually, the rapid and thorough nature of computer analysis will greatly enhance the process and method of the present invention. For example, when an object is represented layer by layer, even a small object may contain layer by layer data for several thousand layers, with a typical layer thickness on the order of 0.001 to 0.002 inches. Each layer, as well, may contain pixel data for a number of surfaces and geometry changes of an object. The layer by layer data presented in this manner is most accurately captured in computer readable format. The method steps of the present invention are preferably carried out through the implementation of computer software programming, which due to the repetitive nature of some of the steps, is very well suited to such a purpose. The preferred embodiment of the method of the present invention is implemented by computer program.

In FIG. 1, the method 10 is shown to include working on and with layer by layer input data 12 through the steps of isolation 14 of the data 12, cleanup 16 of the data 12, edge finding 18 of the representation of the object, sampling 19 the data 12 to reduce the quantity of the data 12, stitching 20 adjacent layers of the represented object together, and generating an output 22 of a surface representation of the object. Each of the method steps of the present invention 10 will be discussed in greater detail below. The steps 14 and 16 of isolation and cleanup of data respectively, are optional, but do provide benefits to the method 10.

Working with layer by layer input data 12 representing individual slices or layers of an object for which a surface representation is desired allows the method 10 of the present invention to work with and operate on much smaller portions of data than the prior art. The ability to work with much smaller portions of data 12 improves the speed, efficiency, and ease of use of the present invention.

Figure 5:
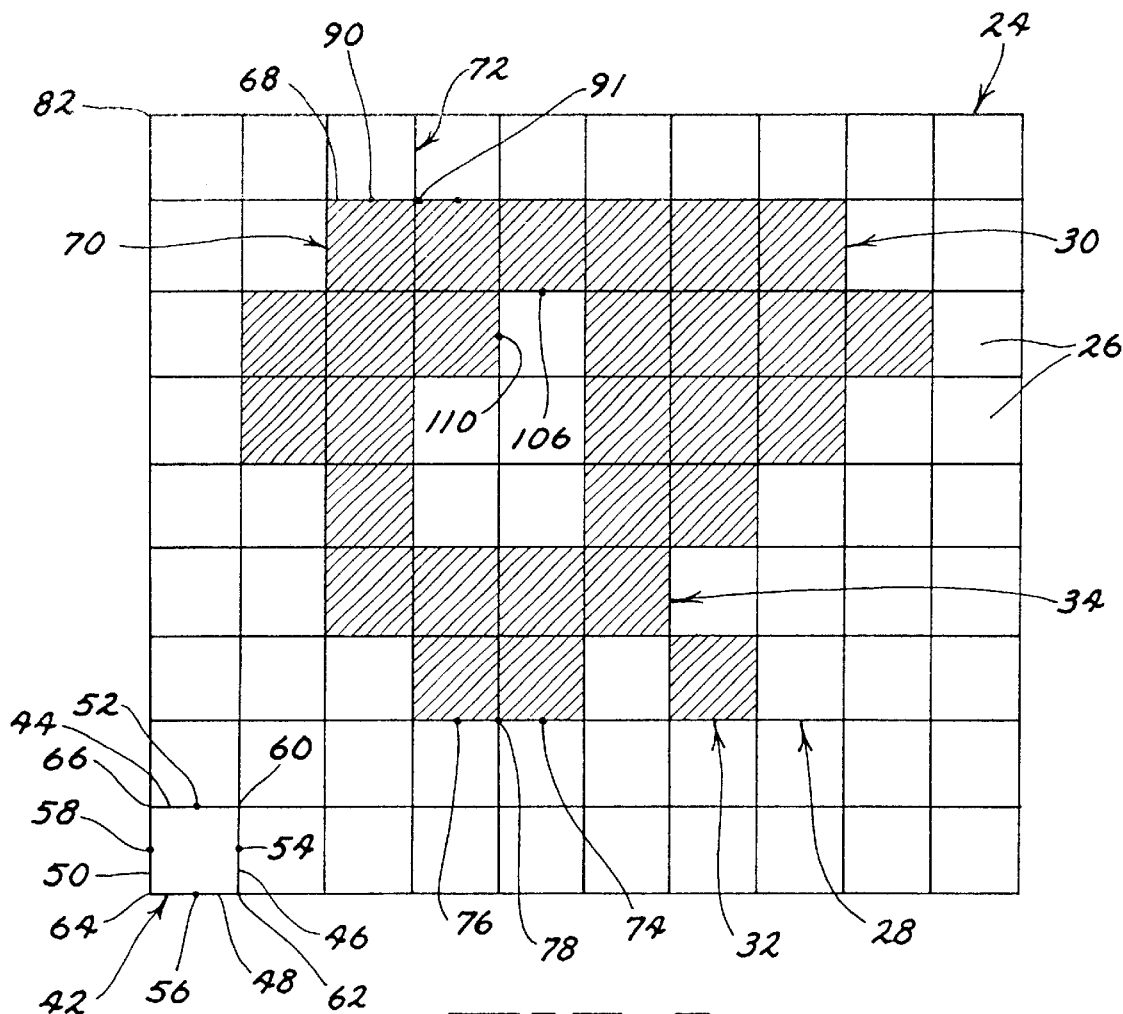
FIG. 5 is a view of a two-dimensional pixel grid.

Referring now also to FIG. 5, a two-dimensional grid representation of a typical layer 24 of an encasement showing individual pixels 26 of non-object material 28 and object material 30 is shown. In this representation, non-object material 28 is represented as a white pixel, whereas object material 30 is represented by a black pixel. The color choice for pixels may be chosen in any manner that provides a distinct boundary between object 30 and non-object 28 material. The information contained in the layer by layer representation will be converted to point data information and will be ordered for the further requirements of the method 10. Each layer 24 of the encasement has its own distinct set of black and white pixels.

Isolation step 14 serves to determine the surface boundary extent of the object 30 to be represented by a surface representation, and also will allow multiple objects in a single encasing or area to be analyzed. Isolation step 14 serves to concentrate the layer by layer analysis of a part to only those layers of the layer by layer representation which contain the actual object. To isolate an object, a pixel containing object material 30 for the object to be isolated is chosen. Following this, all pixels which touch the existing known object pixel or which touch pixels touching the known object pixel, et cetera, are determined by a systematic analysis of each layer of the layer by layer data presented as input data 12 for the method 10. The isolation or monolith step 14 will therefore identify all object pixels belonging to the object. Any random noise or contamination not touching the object 30 chosen will therefore be eliminated from consideration as part of the object 30. Further, layers or areas of the layers not containing any part of the object, may be eliminated. This is known in the art as cropping. With isolation or monolith step 14, multiple objects in a set of layer by layer data can be individually selected, analyzed layer by layer, and stored as separate object data. In this manner, the number of objects which may be contained within a single layer by layer data set for analyzation is limited only by the physical limitations of the machine generating the data. The only requirement for distinct analysis and isolation 14 of multiple objects 30 is that they not touch each other within the encasement or area. The isolation or monolith step 14 need not be performed, but it is a preferred step of method 10.

Isolation step 14, as has been mentioned, serves to eliminate random noise or contamination not touching the object 30 being analyzed. However, further contamination or noise actually touching the surface of an object 30 may very well be present. Such noise or contamination will not be found by isolation step 14. Optional cleanup step 16 involves the layer by layer analysis of the object 30, knowing something of its geometry, for noise or contamination on the surface of the object or on the hardware or machine generating the data. Deletion of such noise or contamination may be done on a layer by layer basis. Alternatively, a computer software program subroutine may be written to eliminate certain blocks of pixels which appear to be noise or contamination by their size. Given the geometry of the object 30, areas of noise or contamination may be small or large. Each individual object 30 will necessarily lend itself to a noise size determination on an individual basis. For example, a large object with straight or flat surfaces may have noise or contamination on a very small scale which is noticeable in a layer by layer pixel representation. On the contrary, a small object, or an object with rapidly changing geometry, may not lend itself to any meaningful surface noise or contamination analysis. Further, if there is a contamination on the hardware or machine generating the data, an anomaly may be present in the same location of every layer. Such an anomaly may also be searched for and removed by the present method.

Optional cleanup 16 may also be performed at a later stage in method 10 when the pixel data representation has been converted to point cloud data.

Figure 2:
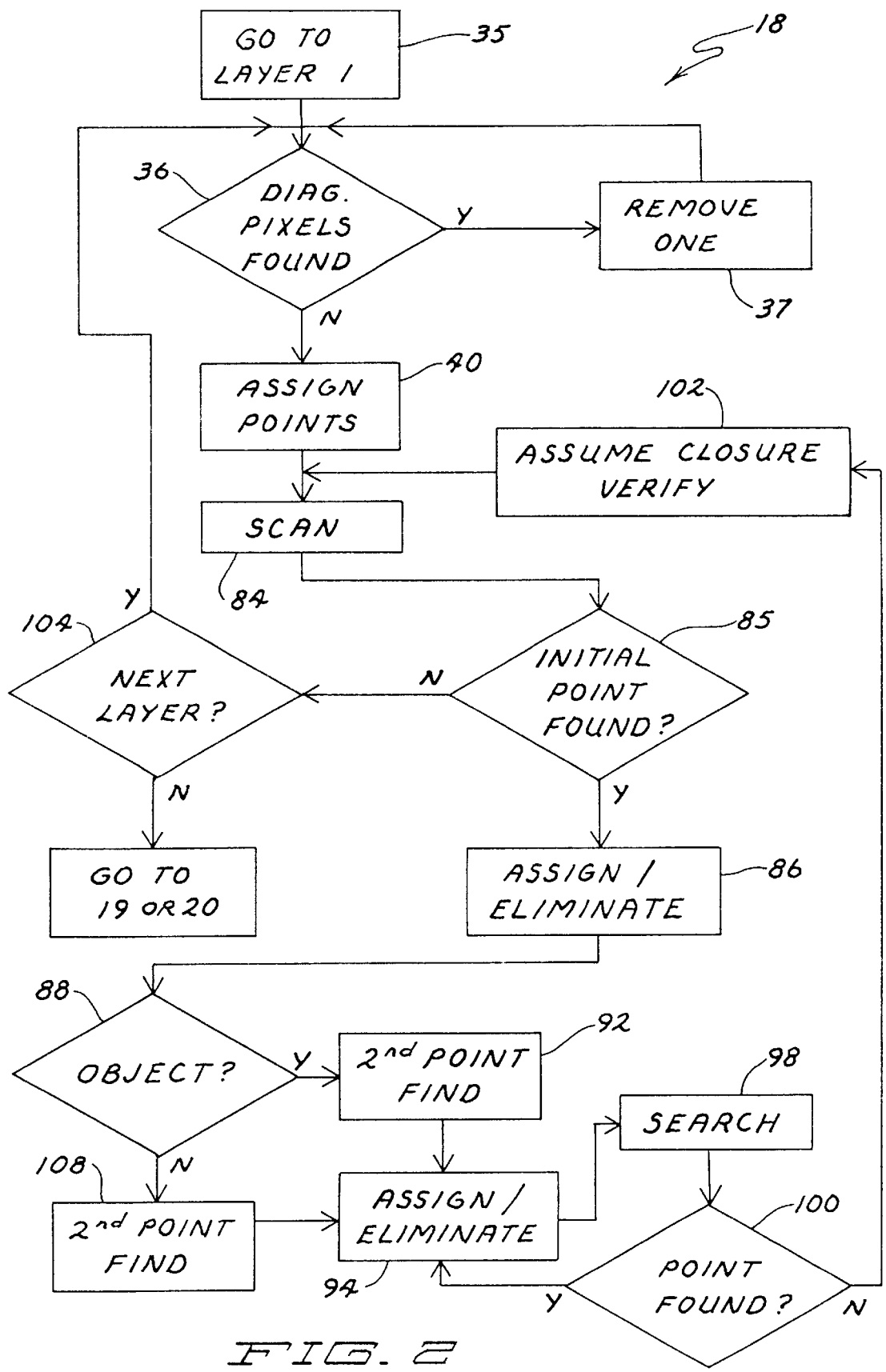
FIG. 2 is a flow diagram of the point find-edge data method of the present invention.
Figure 6:
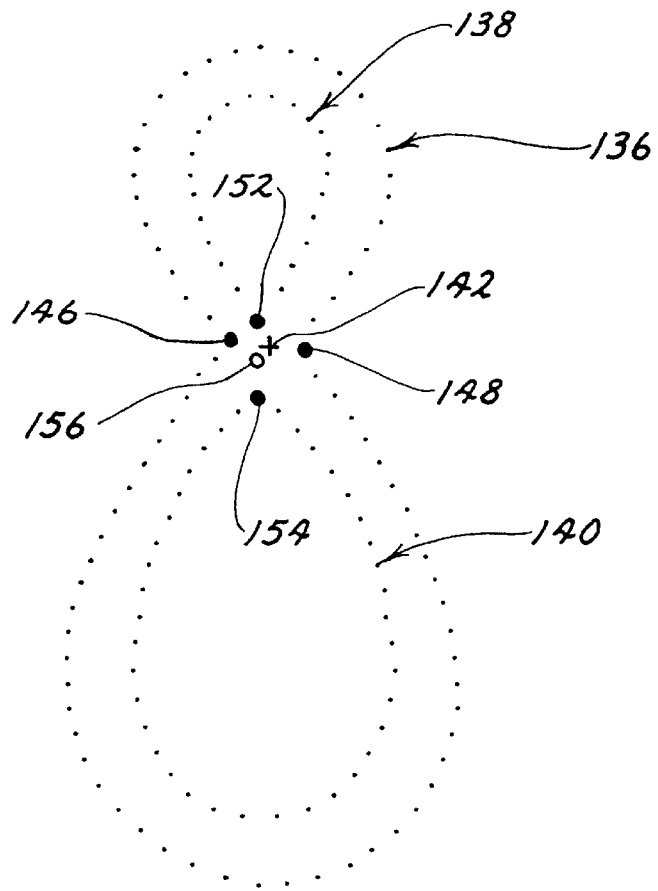
FIG. 6 shows a point cloud representation of a merge location.

Referring now also to FIG. 2, the edge find step 18 of the present method 10 will be discussed in detail. The preferred method of the present invention 10 relies on the conversion of layer by layer pixel data 12 to a layer by layer series of one or more ordered arrays of points which will be designated point clouds. Several point clouds 136, 138, and 140 are shown in FIG. 6. A point cloud is defined as a series of points ordered with respect to each other, forming a closed loop with the final point in the cloud being associated with the first point of the cloud, and representing a path around the object border of interest, either external or internal, on the designated layer. The ordered point clouds of the present invention also have an associated direction to their order. A point cloud may be ordered either clockwise or counter clockwise, depending upon whether the surface or boundary it represents is external geometry or internal geometry respectively. The choice of direction for internal and external geometries is not crucial. However, external and internal geometries should be distinguishable. The preferred implementation of distinguishing the geometries is to order them in opposite directions.

Referring now to FIGS. 2 and 5, the edge-find step 18 will be discussed in detail. The typical layer 24 shown in FIG. 5 represents a two dimensional grid of pixels 26 in which non-object material is shown as white pixels 28 and object material is shown as black pixels 30. Edge-find step 18 starts analysis of the object 30 beginning at the first layer of the layer by layer representation. This is shown as logic step 35 of FIG. 2. Edge-find step 18 continues by searching the current layer for anomalies. Ambiguities such as noise and contamination may have already been removed by cleanup step 16. Further anomalies which may not have been removed by cleanup step 16 may be removed within the edge-find step 18.

A common anomaly is shown in FIG. 5 at the object pixel labeled 32. Object pixel 32 touches pixel 34 of the object 30 only at a corner, and not along any edge, or face. As such, pixels 32 and 34 are designated as being diagonal pixels. The number of potential point location solutions, which are determined by a method described herein below, for such a configuration, is greater than one. Since it is a goal of the present method 10 to reduce the number of ambiguities in creating a surface representation of an object 30, the number of potential solutions for such a situation should be reduced to one. In order to reduce the potential number of solutions to one, when a set of diagonal pixels such as pixels 32 and 34 is encountered as in step 36, the relationship of each of the pixels to the remainder of the object 30 being represented is determined. Following this determination, the appropriate pixel, 32 or 34 in the present example, will be deleted, in logic step 37, depending upon the relationship of the respective pixels 32 and 34 to the object 30. In the example shown, pixel 34 is bordered along at least one of its face edges by another object pixel. Pixel 32, however, is not bordered along any of its faces by another pixel contained within object 30. Because pixel 32 is not bordered on any of its faces by another pixel from object 30, it is the diagonal pixel to be eliminated from consideration. The steps 36 and 37 are repeated until no further diagonal pixels are found. If both pixels are bordered on at least one face by another object pixel, one is chosen at random for removal. Such a small deletion will have little effect on overall geometry.

Once no further diagonal pixels are found on a layer, then the process of assigning points 40 may be commenced. Each pixel has four faces. As an example, pixel 42 in FIG. 5 has four faces 44, 46, 48, and 50 forming its sides. The faces each have a center point, 52, 54, 56, and 58 respectively. The center points of the faces and the corners 60, 62, 64, and 66 of the pixel will be the only eight locations on a pixel to which a point may be assigned.

The step 40 of assigning points is carried out in the following fashion. Points are assigned to locations as follows: for every pixel face which is adjacent a pixel face of a different color pixel, for example the face 68 between object pixel 70 and non-object pixel 72, a point is placed at the center point of the face. Further, for each corner of an object pixel, along a face which is adjacent a face of a pixel of a different color, a point is placed at the corner if and only if the point to be placed would be collinear with points of the faces of the pixels immediately adjacent the corner. This placement is best shown for points 74 and 76 in FIG. 5, which would be placed according to the first point placing criteria. Point 78 is a corner point of an object pixel, along an object/non-object interface. The placing of point 78 would create a straight line of points 74, 78, and 76. Therefore, point 78 is properly assigned. When assigning points, the computer program or assignor of points must remember the color or object/non-object status of the pixel just underneath each point. In the example, the pixel underneath each face point is considered to be the pixel containing the face point which is closest to the bottom 80 of the layer 24. The pixel underneath a corner point need not be determined since corner points will be of the same geometry as the face points which will necessarily be on either side of the corner point. In other words, corner points will be of the same geometry as either the face point before them in order, or the face point after them in order. The specifics of assigning the pixel underneath a point may easily be varied if a different scanning scheme for determining points is used.

Referring now to the assigning of order to points, a scan starting point 82 is chosen at one corner of the layer 24. In the example shown, the scan starting point 82 is at the top left corner of layer 24. The scanning 84, which will be looking for points assigned along the border or boundary between the object material 30 and the non-object material 28, moves left to right and top to bottom. The scanning step 84 looks for a point at each corner and center face of each pixel in order along the scanning route from scan starting point 82. In the example shown, each numbered assigned point is indicated by a dot. Not all point locations are shown.

Logic step 85 determines the subsequent events of scanning step 84 depending upon whether a first point of a point cloud is found. If a first or initial point is found, it is assigned to a new cloud and eliminated from further consideration as is shown in logic step 86. Once the first point is assigned to a cloud, the cloud is designated as an external geometry cloud or an internal geometry cloud according to logic step 88. This step 88 determines whether the pixel beneath the point was an object pixel or a non-object pixel. If the pixel beneath the point was an object pixel, the cloud is designated as an external geometry cloud. If the pixel beneath the point was a non-object pixel, the cloud is designated as an internal geometry cloud. The determination of whether a new cloud is designated as external or internal geometry will determine the ordering of the point cloud. External geometry point clouds and internal geometry point clouds are ordered in different directions for identification purposes. In the example shown external geometry point clouds are ordered clockwise from the initial point and internal geometry point clouds are ordered counter clockwise from the initial point. This ordering may obviously be changed, provided that the external and internal point clouds are ordered in different directions.

By way of example, the initial point 90 of a new cloud is shown in FIG. 5. The pixel 70 beneath point 90 was an object pixel. Therefore, the new point cloud will be designed as a external geometry cloud. It will be seen that the first initial point found in scanning step 84 is always assigned to an external geometry cloud provided the scan 84 is started at an outside corner of a layer.

Once the initial point 90 is found, determined to be an external geometry point, and assigned to a new point cloud, the second point of that particular point cloud will necessarily be in one of two locations. The two possible locations for the second point will be immediately to the right of the first point 90 found, in which case the second point will be a corner pixel point, or immediately down and to the right along a face of the same pixel as the initial point 90. Because of the step 40 of assigning the points, these two possible locations are the only possible locations for the second point of a clockwise external point cloud. When the second point of a cloud is found, it is assigned to the cloud and eliminated from further consideration as shown in logic step 94. In the example, the second point is point 91. If the ordering of points of external geometry is counter clockwise, the choice of location for the second point shown in logic step 92 will obviously be different.

Figure 7:
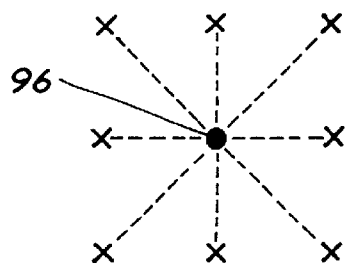
FIG. 7 shows the possible locations of subsequent points of an ordered point cloud.

The second point, and all subsequent points of the cloud, will be one unit of distance away from the previous point in the cloud. A unit in this context is defined as the distance from the current point to the closest point available for consideration. Referring now to FIG. 7, a unit will be further defined. FIG. 7 contains point 96, which will be assumed to be the current point of a point cloud. One unit is defined to be the distance from point 96 to a point at one of the locations designated by an x around the point 96. According to the method of assigning points, the next point in a point cloud after point 96 will necessarily be in one of the locations designated with an x in FIG. 7.

Given the method 90 of assigning points, only one point subsequent to the second point will be one unit away from the point being considered. This will also be true of each point after the third point. The subsequent point which is one unit away from the current point of the point cloud is sought by searching 98 for a point one unit away from the current point. Depending upon whether a subsequent point is found, logic step 100 determines the next step of edge-find step 18. If a point is found, it is assigned a label and an order, and is eliminated from further consideration (step 94). Steps 98, 100, and 94 are repeated until no subsequent point is found.

It will be seen that the choices for the location of the next point in a cloud may be narrowed based upon where the previous point in the cloud was located. This need not be done, but a software subroutine could eliminate the location of a previous point or points as a potential location for a subsequent point.

When no subsequent point is found, the logic step 100 will dictate the end of the 100, 94, 98 step loop, and by step 102, the current point is assumed to be the final point in the cloud. When the final point in the cloud is assumed, the distance between the final point and the first point of the cloud is determined. This distance should be one unit. If this is the case, the current point cloud is closed.

Once a point cloud is closed, the scan step 84 will continue looking for a new initial point from the location of the first point 90. In the example shown in FIG. 5, the next initial point found will be point 106. The pixel directly beneath point 106 in layer 24 is a non-object pixel, meaning that the point cloud beginning with point 106 is an internal geometry cloud. When the point cloud is determined to be an internal geometry cloud in logic step 88, the second point of the cloud is chosen in step 108 as the point immediately down and to the left of the current point. In the example, this is point 110. Once the second point of a cloud is assigned, the steps for assigning the third and subsequent points to the cloud are identical to that of an external geometry cloud (steps 94, 98, 100 and 102).

The steps from 84 forward to 102 are carried out until no further initial points are found on the layer. Following this, when no further initial points are found on the layer, step 85 dictates a search for the next layer. Depending on whether a layer is found, step 104 dictates the next step. If a next layer is found, the edge-find step 18 continues with step 36 and its subsequent steps, the point assignment and edge-find method for the next layer, and all subsequent layers until no next layer is found.

When no next layer is found, indicating that all layers of the object 30 have been converted to point cloud data, the method 10 proceeds to optional step 19. Step 19 involves sampling the ordered point cloud data to determine if points, clouds, or entire layers may be eliminated to reduce the complexity of the data, and increase the speed of the method 10. Sampling 19 is accomplished by examining the data either layer by layer or within layers, looking for certain geometries which lend themselves to simplification by reducing the amount of data necessary to properly represent the object 30. For example, if the geometry of the object 30 is such that it has long, straight or nearly straight internal or external edges, points may be eliminated along the straight or nearly straight edges in order to provide a smaller number of points with which to deal.

The greater the number of points in a series of point clouds, or the greater the number of layers, the slower and more difficult to work with is the file. Consequently, any computer software program implementing the method for analyzing the points will run slower with more data. Manual accomplishment of the method 10 will be similarly slower with more data.

If the geometry of an object 30 is changing slowly, or even not at all, entire layers of the layer by layer representation of point clouds may be removed to reduce the amount of data to be worked with. Since each layer typically represents a thickness along a part on the order of 0.001–0.002 inches, gradual changes in geometry will effectively be captured by even every third or fourth layer of an object. This will be especially true in the case of larger objects. For this reason, a sampling 19 may be used simply to remove every n-th layer of a set of layers, or points within layers.

Examples of sampling 19 include close point sampling, which involves looking for three close points in a straight line. When three close points in a straight line are found, the middle point may be removed without a loss of precision. Layer sampling may involve the retention in the data of one of every three layers, in addition to layers in the location around a change in geometry, which may often be identified by a change in the number of point clouds on adjacent layers.

Such a change would indicate a split or a join in the geometry, which will be discussed in detail below. Finally, points along straight or nearly straight edges may be deleted, leaving only a few points along such an edge to define the edge.

In certain instances and on certain layers, anomalies consisting of points, a cloud, or multiple clouds will be present in the part. Such anomalies may be caused by dust or dirt, air bubbles in encasing material and the like. No matter the cause of the anomalies, it may be desirable to remove them. Deletion of certain noise points or clouds may be performed manually in a layer by layer search. Further, a computer program subroutine could be written in which a point cloud of a certain size would be eliminated. This has been discussed in the context of layer by layer pixel data above.

Deletion of certain anomalies or noise may create a gap in the geometry of an object, which could cause problems with later method steps. In such a situation, points could be inserted along an area or edge of an object. Point addition could be done according to a bisection principle, placing a new point at the mid-point between two points, or new points may be precisely located. A computer program implementation lends itself well to the insertion of new points, since the geometry is already determined and stored within the program. Further, if geometry requires it or errors are discovered, layers or clouds may also be added.

Once the layer by layer data in pixel form has been converted to layer by layer point clouds, and any sampling 19 to remove noise or extraneous layers is completed, the generation of a three-dimensional output format is the next step in the method 10. This step 20 is also known as stitching. The stitching step 20 involves the joining together of adjacent layers of ordered point clouds to create a surface representation which may be exported to an output file such as an STL file. This stitching step 20 requires layer by layer ordered point clouds.

Figure 3:
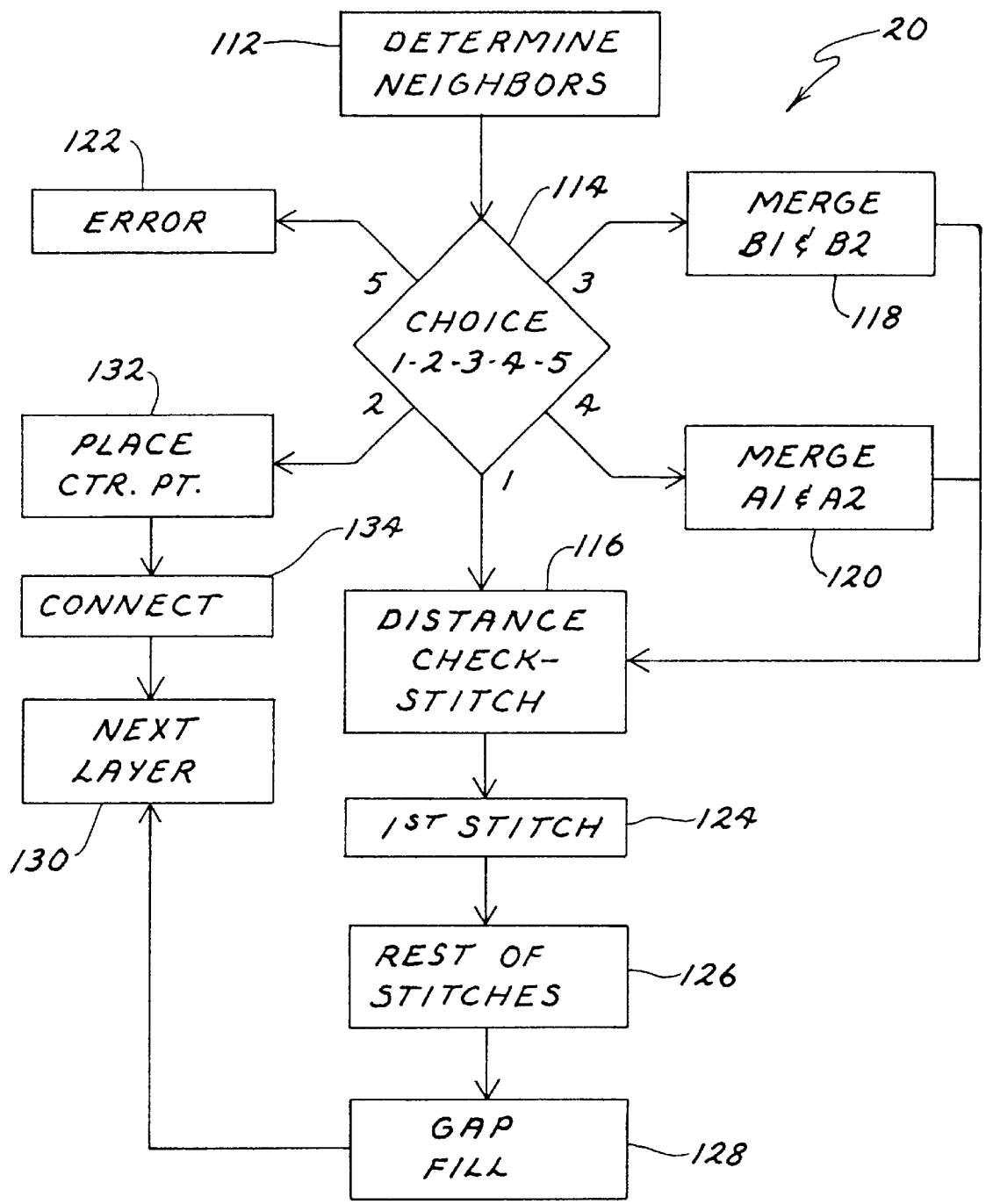
FIG. 3 is a flow diagram of the stitching method of the present invention.

The details of stitching step 20 are shown in the flow diagram of FIG. 3. Once the edge-find step 18 yields layer by layer point cloud data, either as is or sampled as is discussed in step 19, it is ready for stitching step 20. Stitching step 20 begins with the step 112 of identifying layer by layer those clouds defined as neighbor clouds in adjacent layers. As used in this context, neighbor clouds are one or more clouds on a layer adjacent to the current layer that are the closest in distance to the cloud or clouds on the current layer. Closest is defined as the distance from each point on the current layer cloud to the closest point of the cloud on the adjacent layer. Typically, each given cloud will have one neighbor cloud on an adjacent layer. In certain geometries, a cloud may have more than one neighbor. The step 112 of determining neighbor clouds must be accomplished both from the current layer to the adjacent layer below and from the adjacent layer below to the current layer. This determination will result in one of the five choices below:

1. Cloud A on the current layer has one neighbor cloud B on the adjacent layer below, and cloud B has one neighbor cloud A on the adjacent layer above;
2. Cloud A has no neighbor cloud on the adjacent layer below, or cloud B has no neighbor cloud on the adjacent layer above.
3. A split, in which cloud A on the current layer has two neighbor clouds B1 and B2 on the adjacent layer below, and each of the clouds B1 and B2 has one neighbor cloud A on the adjacent layer above;
4. A join, where the current layer has two clouds A1 and A2, each having one neighbor cloud B on the adjacent layer below, and cloud B has two neighbor clouds A1 and A2 on the adjacent layer above; and
5. An error situation which is any other result.

Given the choices 1–5 of the neighbor cloud situation on adjacent layers, a choice 114 must be made. In situation 1, where cloud A has one neighbor cloud B, and cloud B has one neighbor cloud A, choice 114 dictates stitching 116 clouds A and B together. In a split (situation 3), in which the geometry of an object breaks from a single part to two parts, such as the transition from the handle of a fork to the tines, wherein a cloud A has two neighbor clouds B1 and B2, and each of the clouds B1 and B2 has only one neighbor cloud A, choice 114 dictates the merging 118 of clouds B1 and B2 to form cloud B12, and the subsequent stitching 116 of cloud B12 to cloud A. In a join (situation 4) in which the geometry of an object joins from two separate point clouds to form one point cloud, wherein clouds A1 and A2 each have one neighbor cloud B, and cloud B has two neighbor clouds A1 and A2, choice 114 dictates the merging 120 of clouds A1 and A2 to form cloud A12, and the subsequent stitching 116 of cloud A12 to cloud B. If no neighbor cloud is found (situation 2), choice 114 dictates placing a cap according to steps to be described below. In any other situation, choice 114 indicates an error 122.

In a computer program embodying the present invention, or a manual implementation of the method, the error indication 122 may be indicative of a number of errors. In the case of an error 122, the data must be examined further. Steps may be taken as discussed above to add or remove points, clouds, or layers to eliminate error conditions.

Errors which may occur include corrupted data, multiple splits or joins of geometry on a single layer, or splits or joins involving more than two clouds on a single layer. The method 10 of the present invention allows the correction of such errors upon analysis of the data. For example, if multiple splits or joins are detected on a single layer, a layer may be added, and one of the splits or joins extrapolated and moved to the new layer. Such an adjustment of geometry should only be performed when necessary. Further errors may result when the geometry of a layer is complex, which may include two or more clouds which should all be one cloud, or one cloud which should be two or more clouds. In these situations, points may be added, removed, or even slightly moved to properly adjust the geometry. Such steps are encompassed generally by cleanup and sampling steps 16 and 19.

The stitching step 20 continues when two clouds are to be stitched together by step 116, in which the points on the neighbor clouds are connected according to the best fit, by finding the points in each cloud that are closest together, ignoring the distance between the layers. The first stitch between the two clouds to be stitched together is placed by step 124 as a connection between the two points on the neighbor clouds to be stitched together that are closest together. The determination of those points is the most likely point of continuity between the two layers. Following the first stitch 124, the remaining points of the clouds are connected by the process of step 126, in the order that the points are ordered given the following criteria:

1. A point cannot be skipped over in the connection order, because a missed point will result in a gap in the corresponding surface representation which results from the stitching 116; and
2. A point cannot be connected that is behind a previously connected point, or in other words, a point is connected to the closest point on the neighbor cloud moving in a forward direction, never backward.

Following the connection of the remaining points by the criteria of step 126, step 128 fills any gaps in the stitching, so that each point on each of the neighbor clouds is part of a defined triangle when all of the point connections are made, including the connection of the points in each cloud. The facets of the triangles of the stitched together layers will form a partial surface representation of the object 30. Each triangle is a set of three ordered points. The ordering of the points will allow the determination of whether a face of the triangle is an outer surface face or an inner surface face. It is important when stitching clouds together that the defined triangles are all ordered, and ordered consistently. The reason for this is that the facets of the triangles by definition have an inside or an outside. The outside of each triangle facet must be consistently defined. To do this, the order of the three points of each triangle must also be consistent. The stitching also uses this ordering.

Each triangle will have two points on one layer and one point on an adjacent layer. The method of the present invention orders triangles in the following way. If a triangle has two points on the upper of the two layers containing the clouds to be stitched together, the points are ordered so that the segment connecting the two points on the upper layer is in a counter clockwise order between the points. If a triangle has two points on the lower of the two layers containing the clouds to be stitched together, the points are ordered so that the segment connecting the two points on the lower layer is in a clockwise order between the points. The ordering scheme may be changed provided the inner and outer facets of the triangles may be identified.

In situation 2 from the choices of step 114, a cloud will have a neighbor on only one adjacent layer above or below it. This situation is one in which a portion of the geometry of the object 30 no longer appears or first appears in the layer by layer data. In other words, the part of the object 30 which has been appearing in the layer by layer data is terminated, or a new part of the object begins. In such a situation, wherein the point cloud on the given layer has only one neighbor either above or below it, a cap is placed for the cloud according to the following steps. A point is placed in the center of the cloud by step 132, following which step 134 connects each point in the cloud to the center point, defining a series of triangles known as a cap.

When the neighbor clouds between the first adjacent layers are fully connected, step 130 dictates stitching 116 of the neighbor clouds on all subsequent adjacent layers, until all of the neighbor clouds on all layers have been connected, following steps 112 through 128.

Figure 4:
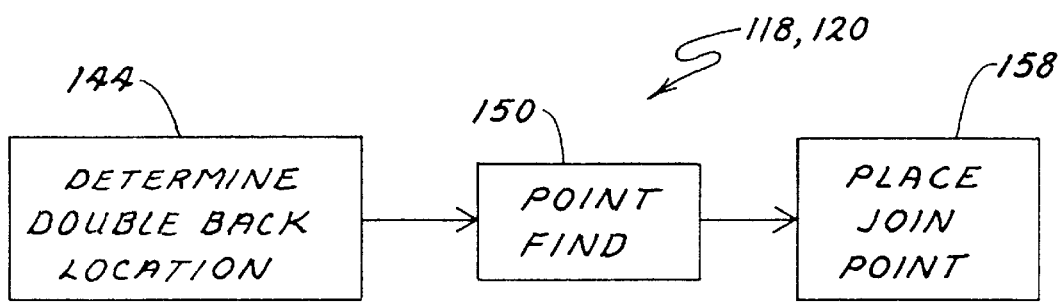
FIG. 4 is a flow diagram of the merge method of the present invention.

In the situations disclosed above wherein a current layer has one cloud with two neighboring clouds on the adjacent layer, or in which a current layer has two clouds each having a neighbor cloud on the next adjacent layer, a split or join respectively has occurred in the object 30. The substep of merging the two clouds on a given layer is shown in detail in the flow diagram of FIG. 4, and in FIG. 6. Splits and joins are identical in structure, but occur in opposite directions. Therefore, only one solution is needed to merge (step 120 or 122) a split or a join.

FIG. 6 shows a point cloud 136 on a given layer which splits into two point clouds 138 and 140 on an adjacent lower level. To merge the clouds 138 and 140, a double back location 142 is determined by step 144. Step 144 determines the double back location 142 by finding the shortest distance between any two points of cloud 136 which are not adjacent to each other and which are separated by a number of points or a distance equal to at least a predetermined fraction of the size of the smaller of the adjacent neighbor clouds to be joined. In the example shown, this is cloud 138.

A fraction of one-half has been found to accurately determine the double back location. The double back determination may be accomplished in any number of ways. The method steps of determining a double back location, in general, require an analysis of the relative size of the clouds to be joined. Such an analysis may be performed on either of the clouds to be merged, but it is generally faster to analyze the smaller of the two clouds. The smaller of the two clouds may be defined in any number of ways, including number of points or area. The double back point 142 is positioned halfway between the points found.

In the example shown in FIG. 6, the points 146 and 148 of point cloud 136 are the two points closest to each other which meet the criteria. The double back location 142 is so named because it occurs at the approximate location where the point cloud 136 appears to double back on itself. The point closest to the double back location in each of the two clouds 138 and 140 to be merged is chosen by step 150. In the example, the points are points 152 and 154 respectively. Once points 152 and 154 are chosen, the location halfway between those two points is determined to be the join location 156. Step 158 places a point at the join location 156 to merge clouds 138 and 140 together.

This point at join location 156 is the only type of point in the method 10 which is used twice in a cloud. The join location point 156 is used as a point in each cloud. The clouds 138 and 140 maintain their ordering, but one cloud is integrated into the other, using the join location point 156 as a merge point. The resulting cloud is an ordered cloud using the join location point 156 twice, at the beginning and at the end of the first cloud merged into the second cloud.

Figure 9:
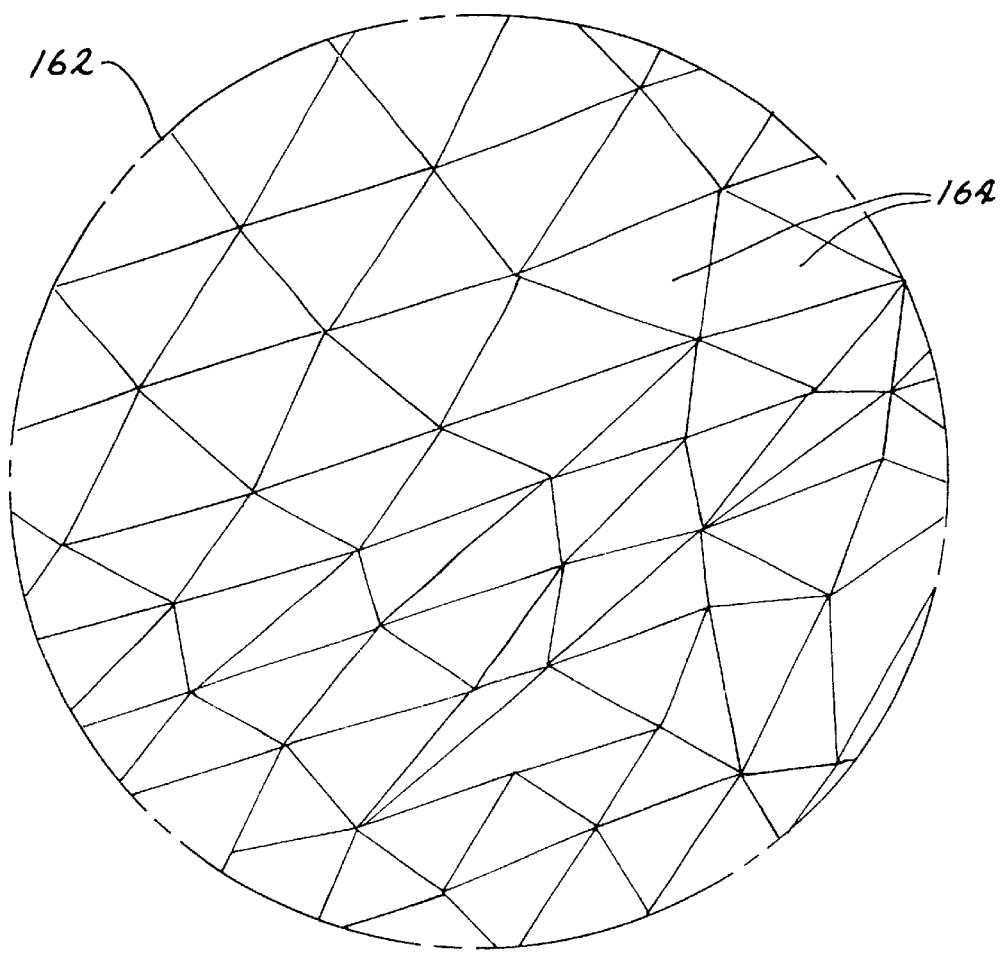
FIG. 9 shows an enlarged view of a portion of the object of FIG. 8.
Figure 8:
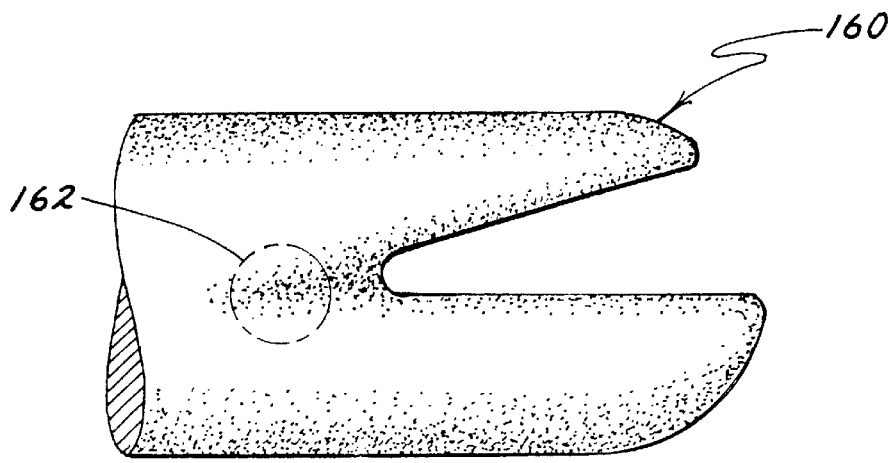
FIG. 8 shows a partial perspective view of a surface representation of an object.

Once all of the neighbor clouds of all adjacent layers have been appropriately stitched together, and all caps have been placed for point clouds with no above or below adjacent neighbors, an output in an appropriate format may be generated. The faces of the triangles joining the point clouds of all layers together form a surface representation of the object. This output may be provided in STL format or any other format appropriate for the generation of a surface based on the data. A representative portion of a three-dimensional representation 160 of object 30 is shown in general FIG. 8. FIG. 9 is an enlarged view of the portion of FIG. 8 enclosed in the dashed circle 162, showing representative individual triangles 164 which make up surface representation 160 of object 30.

The detailed description outlined is considered to be illustrative only of the principles of the invention. Numerous changes and modifications will occur to those skilled in the art, and there is no intention to restrict the scope of the invention to the detailed description. The preferred embodiments of the invention having been described in detail, the scope of the invention should be defined by the following claims.

What is claimed is:

1. A method for generating a surface representation of an object from layered pixel data of the object, comprising the steps of:

converting the pixel data to layer by layer point clouds, wherein converting the pixel data to layer by layer ordered point cloud data further comprises the steps of:
removing one of two pixels which touch each other only at a diagonal corner;
assigning points to black/white pixel edges and certain pre-determined pixel corners; and ordering the generated points into specific point cloud data by:
scanning from a corner of the layer to find a first point;
determining based on stored information whether the point is an internal or external geometry point;
looking for a second point according to whether the first point is external or internal, said internal and said external point clouds being identifiable by different ordering, wherein said internal points are ordered in a clockwise manner and said external points are ordered in a counter clockwise manner;
searching for subsequent points one unit away from the second point until no such point can be found;
assigning the final point as a closure point and verifying that the final point is one unit from the first point; and
continuing to scan to find the first point of the next cloud, repeating steps as necessary until no further first points are found on the given layer;
stitching successive layer point clouds together to form a surface; and
generating a file output representative of said surface.

2. A method for generating a surface representation of an object from layered pixel data of the object, comprising the steps of:
converting the pixel data to layer by layer point clouds, wherein converting the pixel data to layer by layer ordered point cloud data further comprises the steps of:
removing one of two pixels which touch each other only at a diagonal corner;
assigning points to black/white pixel edges and certain pre-determined pixel corners; and
ordering the generated points into specific point cloud data by:
scanning from a corner of the layer to find a first point;
determining based on stored information whether the point is an internal or external geometry point;
looking for a second point according to whether the first point is external or internal, said internal and said external point clouds being identifiable by different ordering, wherein said ordering is made in clockwise and counter clockwise directions;
searching for subsequent points one unit away from the second point until no such point can be found;
assigning the final point as a closure point and verifying that the final point is one unit from the first point; and
continuing to scan to find the first point of the next cloud, repeating steps as necessary until no further first points are found on the given layer;
stitching successive layer point clouds together to form a surface; and generating a file output representative of said surface.

3. A method for generating a surface representation of an object from layered pixel data of the object, comprising the steps of:
converting the pixel data to layer by layer point clouds, wherein converting the pixel data to layer by layer ordered point cloud data further comprises the steps of:
removing one of two pixels which touch each other only at a diagonal corner;
assigning points to black/white pixel edges and certain pre-determined pixel corners; and
ordering the generated points into specific point cloud data by:
scanning from a corner of the layer to find a first point;
determining based on stored information whether the point is an internal or external geometry point;
looking for a second point according to whether the first point is external or internal, internal geometry point clouds being ordered counter clockwise and external geometry point clouds being ordered clockwise;
searching for subsequent points one unit away from the second point until no such point can be found;
assigning the final point as a closure point and verifying that the final point is one unit from the first point; and
continuing to scan to find the first point of the next cloud, repeating steps as necessary until no further first points are found on the given layer;
stitching successive layer point clouds together to form a surface; and
generating a file output representative of said surface.

* * * * *